No. 839,218. PATENTED DEC. 25, 1906.
M. B. SMYTHE.
VEHICLE TIRE.
APPLICATION FILED DEC. 29, 1905.

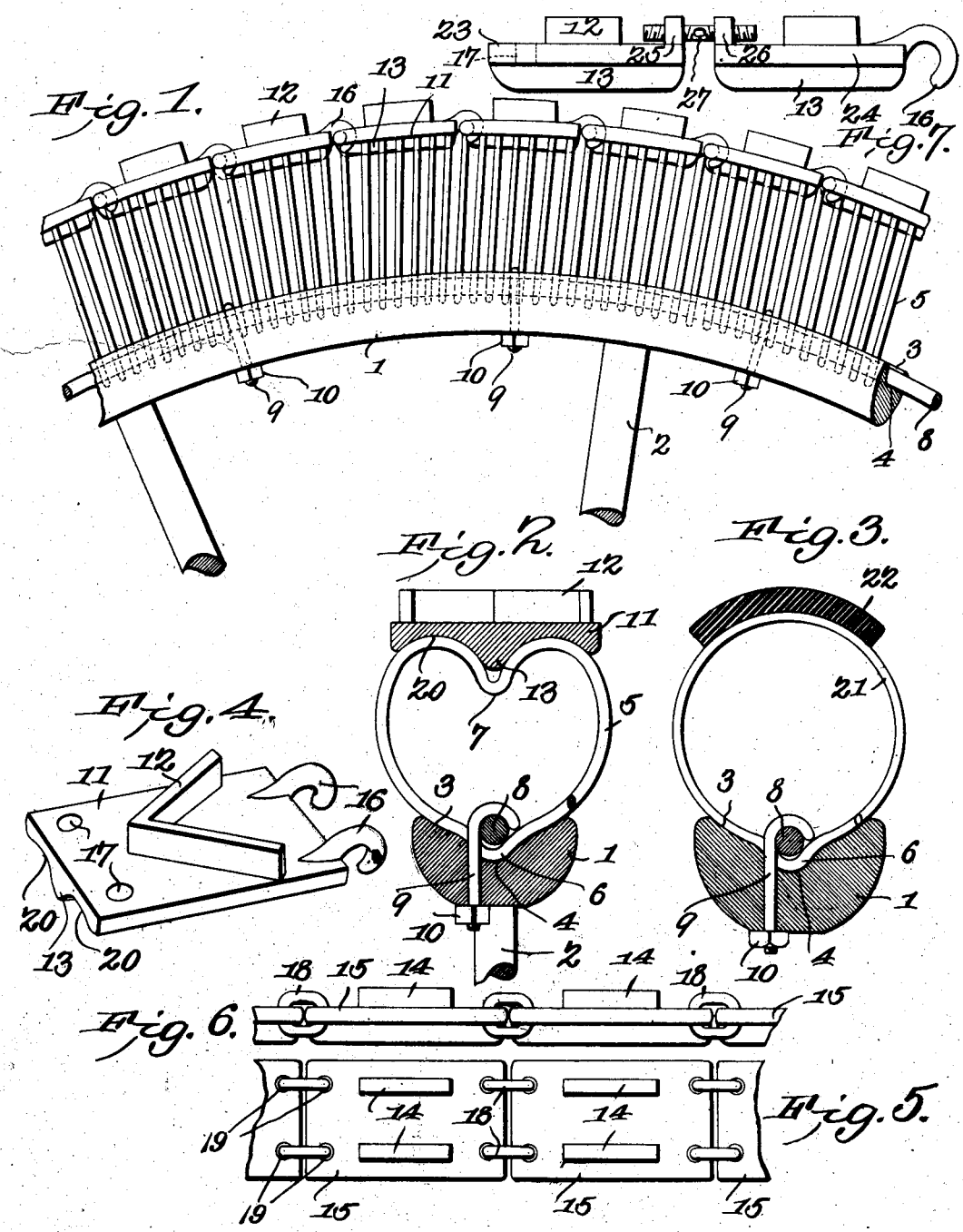

2 SHEETS—SHEET 2.

WITNESSES:

Milton B. Smythe,
INVENTOR,
By
ATTORNEYS.

UNITED STATES PATENT OFFICE.

MILTON B. SMYTHE, OF HOLTON, KANSAS.

VEHICLE-TIRE.

No. 839,218.        Specification of Letters Patent.        Patented Dec. 25, 1906.

Application filed December 29, 1905. Serial No. 293,800.

*To all whom it may concern:*

Be it known that I, MILTON B. SMYTHE, a citizen of the United States, residing at Holton, in the county of Jackson and State of Kansas, have invented a new and useful Vehicle-Tire, of which the following is a specification.

This invention relates generally to vehicle-tires, and more particularly to tires of that class employed upon automobiles.

The object of the invention is to dispense with the ordinary rubber pneumatic tire and in lieu thereof to provide a novel form of tire which shall possess the same resiliency as a pneumatic tire but be devoid of its disadvantages, such as the danger of being punctured, mutilated, or requiring frequent repairs.

A further object is in a novel manner positively to prevent skidding and to increase the tractive properties of the tire.

With the above and other objects in view, as will appear as the nature of the invention is better understood, the same consists in the novel construction and combination of parts of a cushion vehicle-tire, as will be hereinafter fully described and claimed.

Figure 8:
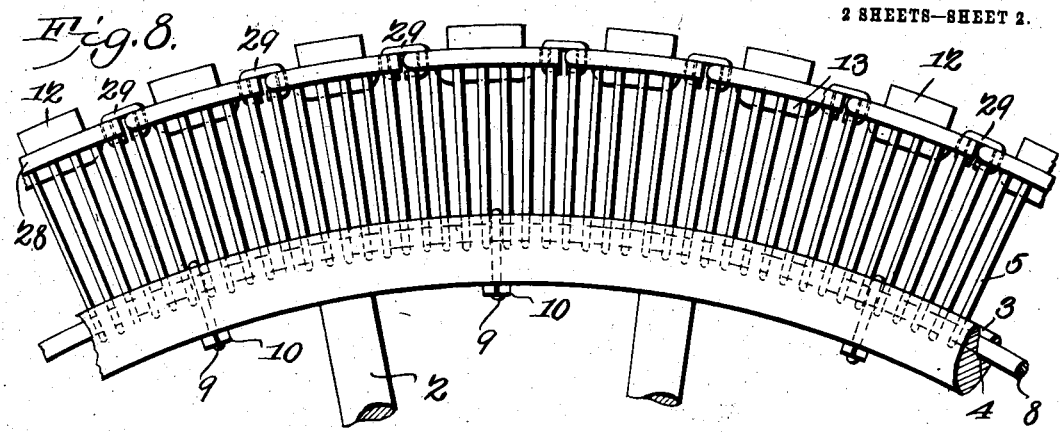
Figure 9:
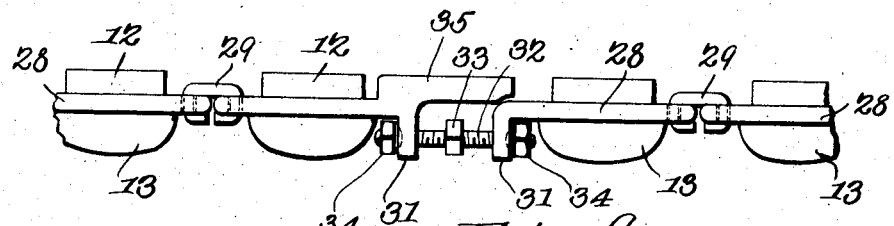
Figure 10:
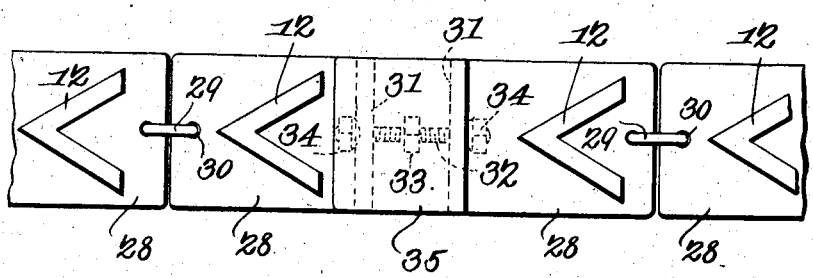

In the accompanying drawings, forming a part of this specification, and in which like characters of reference indicate corresponding parts, Figure 1 is a view in elevation of a portion of a vehicle-tire constructed in accordance with the present invention, showing the same assembled with the wheel-rim. Fig. 2 is a view in transverse section through the tire shown in Fig. 1. Fig. 3 is a transverse sectional view through a slightly-modified form of tire. Fig. 4 is a perspective detail view of one of the traction elements used in conjunction with the drive-wheels of an automobile furnished with the tire shown in Figs. 1 and 2. Fig. 5 is a view in plan of a plurality of traction elements used in conjunction with the front wheels of an automobile furnished with the tire shown in Figs. 1 and 2. Fig. 6 is an edge view of the elements shown in Fig. 5. Fig. 7 is a perspective detail view of a portion of the tread. Fig. 8 is a view in elevation of a portion of a slightly-modified form of vehicle-tire, showing the same assembled with the wheel-rim. Fig. 9 is an edge view of a portion of a slightly-modified form of shield or tread, exhibiting, more particularly, means for connecting the ends thereof. Fig. 10 is a view in plan of the shield shown in Fig. 9.

Referring to the drawings and to Figs. 1, 2, and 4 thereof, 1 designates the rim, and 2 the spokes, of a vehicle-wheel. The rim is, by preference, made of metal and is provided with the usual channel 3, in which the ordinary tire fits, and a supplemental channel 4 for a purpose that will presently appear. The tire 5 is constructed of an endless coiled spring which, as shown in Fig. 2, is approximately heart-shaped in cross-section in order to provide teats or tire-holding elements 6 and seats or shield-holding elements 7. The teats engage the supplemental channel 4, and thus positively hold the tire against lateral movement relatively to the rim and are firmly locked in place by a keeper 8, which consists of a bar of metal that rests in the groove formed by the teats and is held therein by J-bolts 9, the hooks of which, as shown in Fig. 2, embrace the keeper and the shanks of which project through the rim and carry nuts 10. These bolts or locking elements are to be spaced at any desired distance apart and will be thoroughly effective for the purpose designed. The shield or tread to which reference has been made consists of a plurality of links 11, each provided on its outer face with a ground-engaging element 12 and on its inner face with a rib 13 to engage the seats 7, as clearly shown in Fig. 2. As shown in Fig. 4, the traction element 12 is V-shaped, and this form of element will be employed on the rear tire in order to secure the highest possible traction, while the like elements 14 on the links 15 of the tread of the front wheels will be straight and extend longitudinally of the links, as shown in Fig. 5. The means for connecting the links shown in Fig. 4 consists of hooks 16, provided at one terminal of the link and orifices 17, provided at the other terminal, while in the form of tread shown in Figs. 5 and 6 connection between the links is secured by rings 18, that engage alined orifices 19 in the terminals of the links. Of course it will be understood that, if preferred, the links 15 may be provided with hooks and orifices similar to those shown in Fig. 4, and, as this will, be obvious, detailed illustration of such arrangement is deemed unnecessary.

In assembling the tread with the tire the individual coils thereof will be compressed in order to permit the hooks on one terminal of the tread to engage with the orifices of the other terminal thereof, and when the parts are thus combined they will be positively held against accidental separation in the use of the tire. As clearly shown in Figs. 2 and 4, the under side of the link on each side of the rib is provided with a groove or depression 20, which adapts the link to conform more closely to the outer face of the tire, and thereby prevent any rocking movement relatively thereto.

In the form of the invention shown in Fig. 3 the tire 21 has its outer face circular, and applied to this surface is a rubber shield 22, which may be held combined with the tire in any preferred manner. The inner surface of the tire is provided with teats 6, similar to those shown in Figs. 1 and 2, that are held within the supplemental channel 4 of the tire by a keeper 8 and J-bolts 9 in the manner described. Instead of securing the terminals of the tread in the manner described the two end links 23 and 24 (shown in detail in Fig. 7) may have their opposed ends provided with outstanding orificed lugs 25 and 26, the orifice in one being right-hand threaded and that in the other left-hand threaded and the two orifices being engaged by a right and left hand threaded bolt 27, adapted to be turned by a suitable implement, thus to place the tread under requisite tension. The bolt will be preferably made of brass in order to prevent it from becoming rust-locked.

In the form of the invention shown in Figs. 8, 9, and 10 the links 28 of the shield may be of the same construction shown in Figs. 4 and 6, the main difference being that the links are connected by open rings 29, one being disposed at each end of a link and between its sides and engaging an orifice 30 therein. Each of the terminal links is provided with a downward-extending orificed toe 31, through which projects a right and left hand threaded bolt 32, having between its ends a polygonal abutment 33 to be engaged by a suitable wrench to effect turning of the bolt. The terminals of the bolt carry nuts 34, the semispherical inner faces of which are mounted and bear against the outer faces of the toes, and thereby reduce friction between these parts to a minimum, as the nuts will yield relatively to the toes in the use of the tire. In order to bridge the space between the two toes, thus to maintain the continuity of the tread, there is a bridge piece or plate 35 provided, which is, by preference, formed integral with one of the terminal links and has its free end disposed over the other. This bridge-piece is of substantially the same height as the ground-engaging element 12 and will therefore exert tractive force in use.

By employing the open rings, as described, the shield as a whole will be rendered more flexible, may be more cheaply constructed, and will be thoroughly effective for the purposes designed.

The improvements herein defined while simple in character will be found thoroughly efficient for the purposes designed and will result in the production of a tire having all the advantages of a pneumatic tire without any of its disadvantages.

I claim—

1. The combination with a rim provided with a non-resilient channel, of a tire composed of convolutions provided with alining teats to engage the channel, and means for securing the teats within the channel.

2. The combination with a rim provided with a channel, of a tire composed of convolutions having teats to engage the channel, a keeper engaging the inner walls of the teats, bolts having means to engage the keeper, and nuts carried by the bolt.

3. The combination with a rim, of a tire composed of convolutions, the outer faces of which are provided with seats, and a tread consisting of connected elements having parts to engage the seats.

4. The combination with a rim provided with a channel, of a tire composed of convolutions the inner portions of which are provided with teats to engage the channel and the outer portions of which are provided with seats, means for securing the teats within the channel, and a sectional tread having the inner face of its members provided with ribs to engage the seats and their outer faces provided with traction devices.

5. The combination with a rim provided with a channel, of a tire composed of convolutions the inner portions of which are provided with teats to engage the channel and the outer portions of which are provided with seats, means for securing the teats within the channel, and a sectional tread having the inner faces of its members provided with ribs to engage the seats and their outer faces provided with V-shaped traction devices.

6. The combination with a rim, of a tire composed of convolutions, the outer faces of which are provided with seats, a tread consisting of connected elements having parts to engage the seat, and means for connecting the terminals of the tread and for holding the same under tension.

7. The combination with a rim, of a tire composed of convolutions, the outer faces of which are provided with seats, a tread consisting of connected elements having parts to engage the seat, and means including a traction device for connecting the terminals of the tread and for holding the same under tension.

In testimony that I claim the foregoing as my own I have hereto affixed my signature in the presence of two witnesses.

MILTON B. SMYTHE.

Witnesses:
W. W. NAYLOR,
G. R. BECKWITH.